United States Patent Office 3,532,220
Patented Oct. 6, 1970

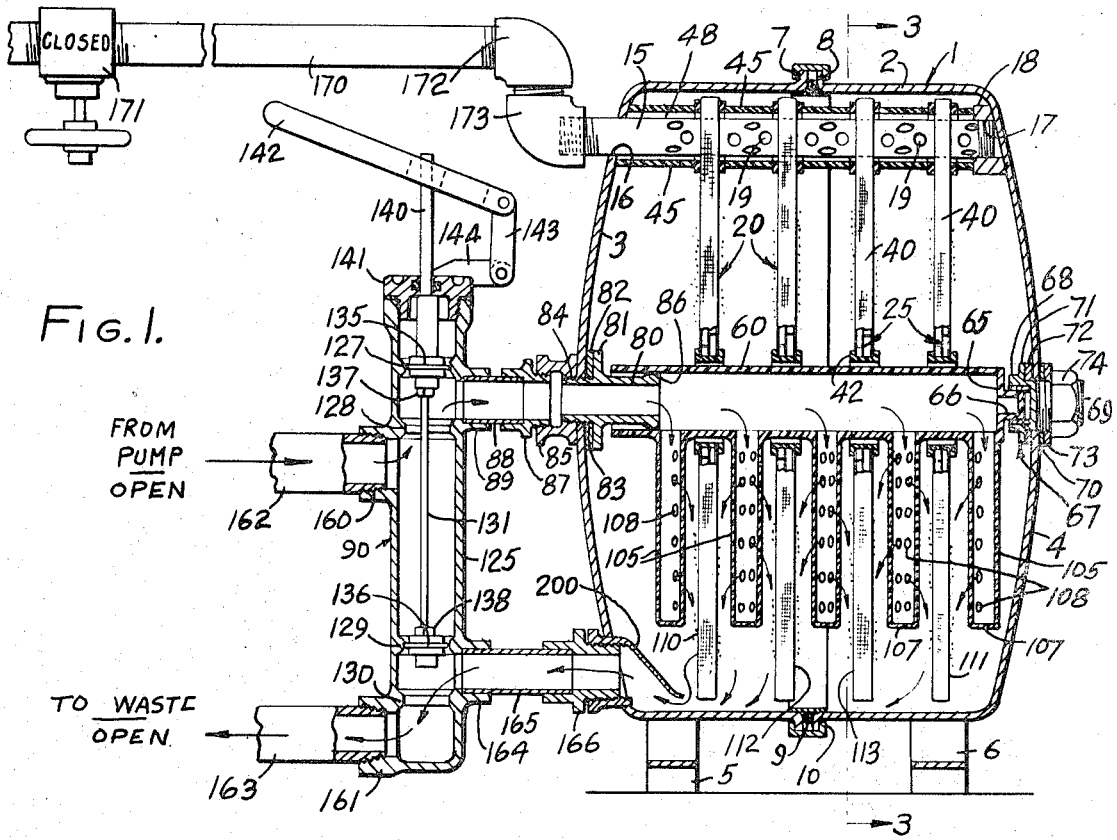
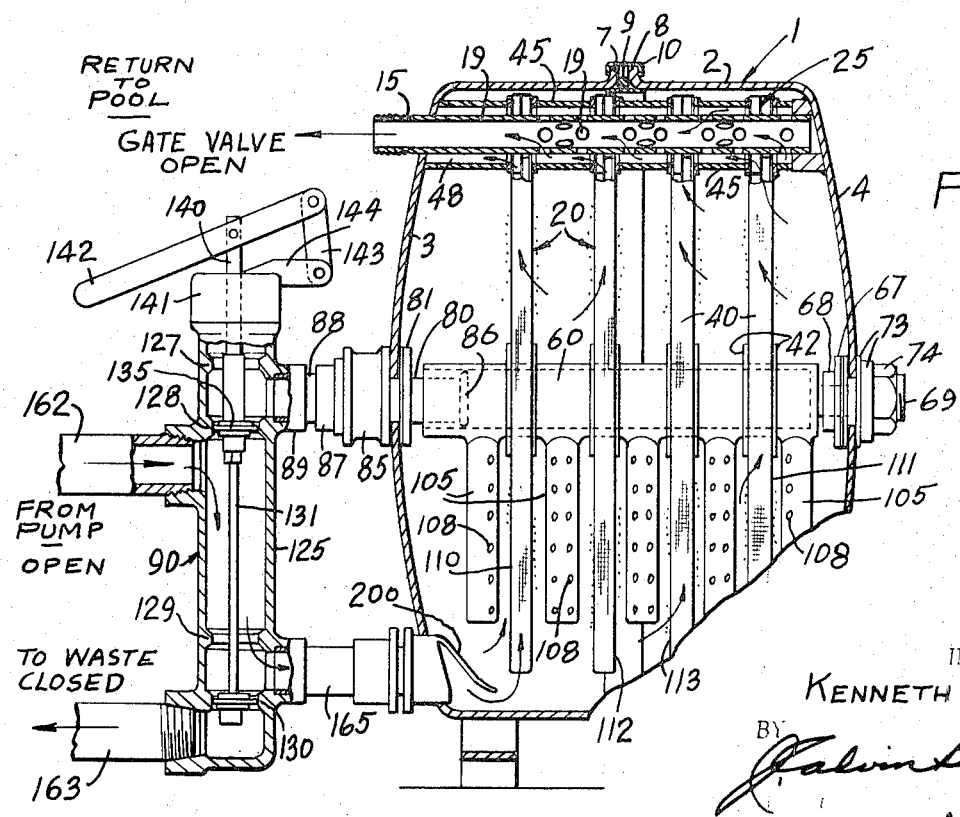

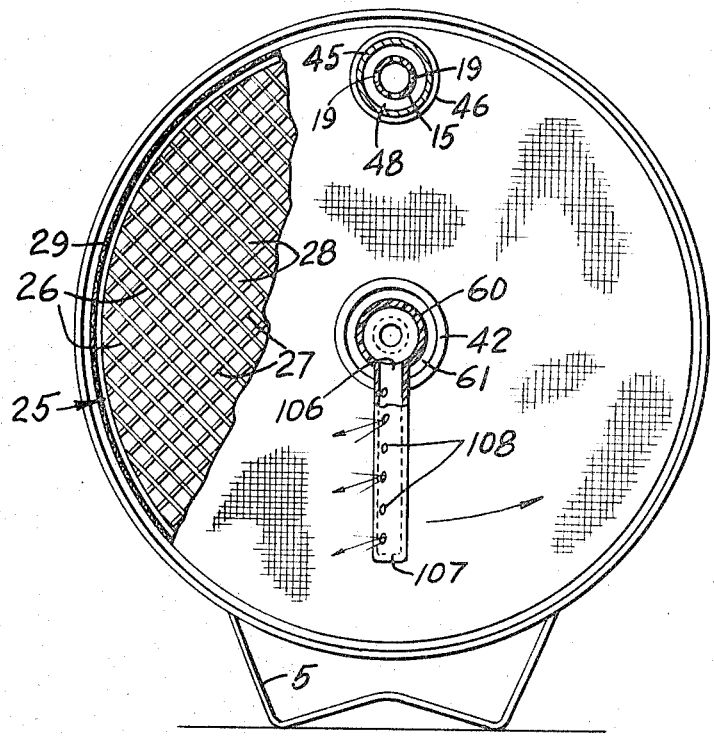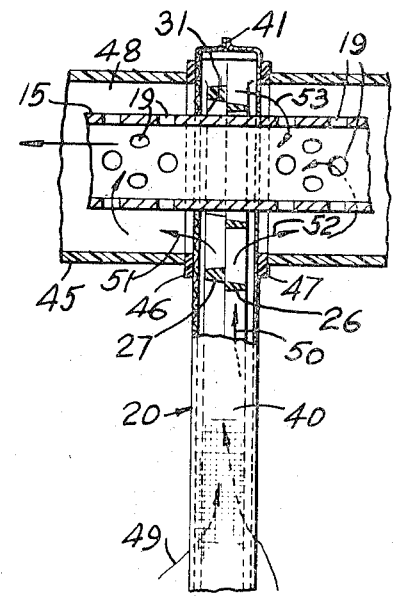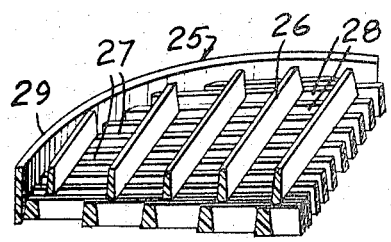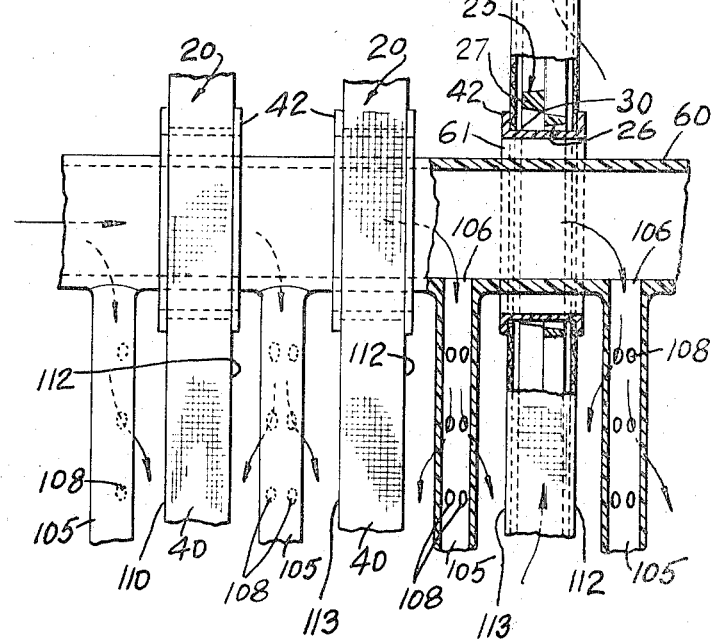

3,532,220
MULTIPLE ELEMENT FILTER ASSEMBLY, SPRAY
JET CLEANING MEANS
Kenneth Lewis, 8291 Lambert Drive,
Huntington Beach, Calif. 92647
Filed Dec. 16, 1968, Ser. No. 784,104
Int. Cl. B01d 25/32, 29/38
U.S. Cl. 210—334
4 Claims

ABSTRACT OF THE DISCLOSURE

The swimming pool filter device comprises a drum type tank having stationary spaced apart annular filter disks therein, each filter disk has a septum enclosed by a fabric envelope and dirty water from the pool directed within the tank passes through the envelopes to remove the dirt. A tube communicates with the interior of each envelope and provides a return to the pool of filtered water; within the tank and extending centrally of each filter disk is a tubular shaft carrying radial orifice tubes positioned adjacent the radial envelope surfaces. When the envelopes require cleaning, the tubular shaft is rotated by pressure water passing through the orifice tubes and jetting at an angle against the envelopes.

---

The present invention relates to a swimming pool filter and constitutes an improvement upon my Swimming Pool Filter Device, U.S. Pat. No. 3,069,014, issued Dec. 18, 1962. In the device of the patent aforesaid, a drum type casing is utilized and within the same are filter disks each comprising a septum or grid surrounded by a fabric envelope and mounted on a rotatable tubular shaft. Suitable plumbing means is utilized for removing dirty water from the casing to a sump, as well as plumbing leading to the tubular shaft for removal of clear water received within the filter disks and directed therefrom to the pool. In my patented device the filter shaft is adapted to be rotated for the purpose of cleaning the filter envelopes of dirt and debris, including diatomaceous earth which coats the envelopes, to a sump. It has been found that this method, while efficient, is nevertheless wasteful of water. Sometimes the slurry comprising a filter aid material such as diatomaceous earth carried by the water does not completely and satisfactorily coat the fabric envelopes, or there is a buildup around the center of the filter disks of dirt and excess filter aid material which impedes flow and reduces the effective filtering area of the filter disks.

An object of the present invention is to overcome the deficiencies mentioned supra and to provide a swimming pool filter device having filtering disks in which the entire exposed area of the filter disks at all times functions for a filtering operation without any buildup of excess filtering material or dirt and debris to render the filtering disk effective as to all areas.

A further object is the provision of a swimming pool filter device wherein filter disks are incorporated of the type which includes a fabric envelope which disks are held stationary when in a suitable casing and in which the filter disk fabric envelope may or may not be coated with a filter aid material and which will be efficient whether coated or uncoated with filter aid material.

Another object is the provision of a filter disk utilizing a fabric envelope, which fabric may be coated with a filter aid material or left uncoated and in which the fabric envelope may be maintained in a clean condition.

Another object is the provision of a filter device utilizing one or more disks utilizing fabric envelopes wherein the problem of abrasive action on the fabric envelope is eliminated such as may occur in that type of device wherein the filter disks are rotated.

A further object is to provide a filter device which is ready for instantaneous filtering action without the necessity of exhausing air from a casing holding the filter in order to render the same serviceable.

A further object is R the provision of a filtering device utilizing disk type filters and wherein the filters are subjected to a scouring action to remove dirt and debris therefrom, and the saving of water in so doing.

Another object is the provision of a filtering device utilizing a filter and a pump wherein water may be circulated from the filter to the pump and back to the filter while at the same time providing for a scouring action of the filter.

Another object is the provision of a filter device utilizing a disk filter wherein a slurry is spread evenly on the filter disks and in which during pump action or circulation, the filter aid and any dirt is evenly mixed before being distributed on said disks.

Other objects and advantages of the invention will be set forth in the specification.

In the drawings:

FIG. 1 is a fragmentary transverse vertical sectional view of the filter device as an entirety and showing a valve system, the valve being in one position;

FIG. 2 is a fragmentary sectional view similar to that of FIG. 1, the valve being shifted as to position;

FIG. 3 is a fragmentary sectional view on the line 3—3 of FIG. 1;

FIG. 4 is an enlarged fragmentary sectional view of elements of the invention shown in both FIGS. 1 and 2; and, FIG. 5 is a fragmentary partially sectional perspective view of a septum or grid construction for the filter disks.

Referring now to the drawings, the invention includes a casing 1 having a circular end wall 2 and concavo-convex side walls 3 and 4 joined with the end wall. The casing 1 having a circular end wall 2 and concavo-convex side walls 3 and 4 joined with the end wall. The casing is suitably supported in an upright position by means of legs 5 and 6 of any suitable geometric form such as shown in FIG. 3. For convenience, the end wall 2 is split so as to provide two casing halves the split portion for both parts being provided with annular flanges 7 and 8 between which is placed a circular gasket 9 with a channel ring 10 encircling the end wall and the two flanges to hold the two parts in working relationship. A casing of the type just described is described in Pat. No. 3,069,014.

Adjacent the top of the casing and within the casing and extending transversely of the two halves thereof is a pipe 15, the pipe being passed through an opening 16 in the side 3, the end of the pipe at 17 being threaded to a fitting 18 carried on the interior of the side 4. Within the casing the pipe is provided with a series of transverse perforations 19 which permit communication between the exterior of the pipe. This pipe, as will hereinafter appear, is for receiving and conducting clean water after a filtering operation. The pipe 15 is adapted to support one or more disk type filters 20, the disk type filters being spaced apart as shown in the figures. Thus each disk type filter is suspended within the casing with suspension occuring at the top of the casing and the disk type filter extending to a position adjacent the bottom of the casing, as shown in FIGS. 1 and 2. Thus, it may be said that the support for each disk type filter is eccentrically positioned and adjacent the rim or curved edge of the filter.

Each disk type filter regardless of the number thereof is constructed as shown in FIGS. 3, 4 and 5, and includes a septum or grid 25 comprising separated ribs 26 and 27 the ribs 26 all lying in one plane, as do the ribs 27 and the ribs 26 and 27, regardless of the number, are bonded together and are substantially in right angular relationship to provide a plurality of passageways 28 therebetween making a septum or grid of considerable strength and one that is easily molded from plastic material. The ribs are joined by circular rim 29, the rim being of a width equaling the depth of the ribs 26 and 27. The septum is so formed as to provide a central opening as shown in FIG. 4 at 30, thus providing an annular type septum or grid, and in this connection the septum is provided with a transverse eccentric opening or bore 31 through which the pipe 15 is passed for the purpose of supporting the filter disks. A fabric envelope 40 encloses each septum or grid and said envelope conforms to grid form and is closed at 41 externally of the rim 29 while said envelope at the opening 30 is provided with a U-shaped gasket 42 closing the central opening 30 of the grid and, likewise, closing the envelope 40. It is noted that this U-shaped gasket has side flanges which engage the sides of the envelope to make this portion fluid tight against entrance of water into the envelope at the opening 30. The gasket 30 may be formed of any suitable material such as neoprene to assure a tight engagement with the opposite sides of the envelope.

As shown in the several views, a plurality of filter disks of like construction are utilized within the casing 1. The number of filter disks will depend upon the gallonage of water to be filtered and the time factor in which filtering is to be accomplished, and accordingly, the casings may vary as to the volume of water contained therein and the areas of the filter disks and the number thereof. Usually in small pools the pump for moving the water therefrom usually moves forty to fifty gallons per minute, although the pump pressure may vary. It is essential that the filter disks be in parallel spaced apart relationship as shown in the drawings and in the present instance four filter disks are utilized for illustrative purposes. The filter disks are separated by spacer sleeves 45 which spacedly surround the tube of pipe 15 and said spacer sleeves may vary in length. The spacer sleeves 45 provide a jacketed space 48 between said sleeves and the tube 15. This jacketed space is for the admission of water within the space to be received within the tube 15 by passage through the perforations 19. As this is clean water after a filtering operation, it is essential that the spacer sleeves tightly abut the filter disks so as to have a fluid tight fit which is accomplished by providing flat washers at ends of the spacer sleeves and abutting the fabric envelope as shown at 46 and 47 for each spacer sleeve and filter disk. This arrangement is best shown in FIG. 4 wherein the packeted space 48 receives filtered water, or clean water for passage through the perforations 19 into the tube 15. It will be observed from FIG. 4 that the spacer sleeves through the medium of the washers prevent any liquid from passage into the jacketed space 48 from the interior of the casing and which water surrounds the separator rings. All water received in the jacketed space 48 must be conducted to said space by the filter disks and particularly the filtered water received within the envelope 40 for passage through the ways provided by the grid or septum 25 to said jacketed space 48. This is illustrated by the arrows 49, 50, 51, 52 and 53 in FIG. 4 indicating flow passage of water through the filter into the tube 15.

Passed centrally through the axially aligned bores 30 of the filter disks is a tubular shaft 60. As noted, the tubular shaft extends between sides of the casing and central thereof. The bore opening 30 of each filter disk does not contact the tubular shaft but is annularly spaced therefrom as shown at 61. The tubular shaft is imperforate and the shaft is mounted for rotation between the sides 3 and 4 of the casing. One end of the shaft is closed by a disk 65, the disk provided with a projecting stud 66 functioning as a journal. The side 4 carries member 67 having a portion 68 for receiving the stud or journal 66. Member 67 is provided with a bolt 69 which is passed through a bore 70 of the side 4. Member 67 is flanged at 71 and interposed between the flange and the inner surface of the side 4 is a gasket 72. Surrounding the bolt 69 and exterially of the side 4 is a washer gasket combination 73 being a lock nut 74 carried by the bolt and bearing against the washer gasket combination to secure the member 67 against the side 4 and against any leakage of liquid from the interior of the casing. The opposite side 3 of the casing carries an elongated sleeve 80 received within the tube 60 at the end opposite the stud or journal, the sleeve provided with an annular flange 81 and a gasket 82 interposed between the flange 81 and the interior of the side 3. Side 3 is provided with a hole 83 in axial alignment with the hole 70 and the sleeve is provided with a threaded portion 84. A lock nut 85 is carried on the threads 84 whereby tightening of the nut will cause firm engagement of the sleeve gasket and flange to make tight fit engagement with the side 3. In the showing, the sleeve 80 has a diameter less than the internal diameter of the shaft 60, the sleeve being provided externally at its inner end with an annular flange 86 having free contact with the interior of the shaft 60 so as not to impose undue friction to rotation of the shaft 60. A further fitting 87 is secured to the lock nut 84 and this fitting is joined through the medium of a pipe 88 with fitting 89 of a valve designated generally as 90.

The tubular shaft 60 is provided with a series of radially extending tubes 105. These tubes of which there may be a number, in the present instance five, are adjacent the filter disks. The tubes communicate at one end 106 with the interior of the tubular shaft while the outer end of each of said tubes is closed as shown at 107 and each tube is provided with a series of orifices 108 communicating externally and internally of each tube with the axis of each orifice at an angle to the radius of said tube whereby when water is passed under pump pressure into said tubular shaft 60 and into said tubes, the water will be jetted from the orifices at an angle against the outer surfaces of the filter disks to cause rotation of the tubular shaft 60. Orifices for jetting water against surfaces of contiguous filter disks are not employed in the end tubes as the end tubes will jet water against a single surface of the end filter disks, being the surfaces of the filter disks at 110 and 111. The number of orifices for the tubes may vary although in the present instance the orifices for jetting water against a surface of the intermediate disks at 112 and 113 are directed in opposite directions to produce rotation of the tubes when water is jetted through said orifices. In the showing, particularly FIG. 1, a single vertical row of orifices is utilized for jetting water against opposed surfaces of each filter disk shown at 112 and 113. The water which is directed through the orifices jets against the surfaces of the filter disks and as the filter disks are stationary, and the water jet is at an angle to the surface against which the water impinges, rotation of the tubular shaft 60 and the orifice tubes results. As stated, the tubular shaft is loosely mounted so that rotation of the shaft occurs without appreciable friction. In the showing of FIGS. 1, 2 and 3, the tubes 105 are shown in alignment and depending from the tubular shaft. However, the tubes may be in diametric relation to counterbalance the tubular shaft. However, the tubes 105 are formed of light material such as a plastic and inasmuch as will hereinafter appear, the interior of the casing is usually filled with water, the counterbalancing of the shaft is not necessary particularly so as the shaft is not rotated rapidly but is intended to be rotated at such a speed that the jet of water through the orifices for impingement against the surface of the filter disk is such as to produce a scouring action on the envelopes.

The valve 90 as to construction and operation, is fully described and set forth in application for U.S. Pat. Ser. No. 421,265, filed Dec. 28, 1964, and now U.S. Pat. No. 3,315,812.

Briefly, the valve 90 includes a stand pipe 125 provided on its inner surface with annular valve seats at 127, 128, 129 and 130. A valve stem 131 is within the stand pipe 125 and carries disk valve assemblies 135 and 136. Each valve assembly is characterized by having two rigid disks and an intermediate gasket for valve seat engagement. The disk valve assemblies are adjustable as to position on the stem by suitable means shown at 137 and 138 through the medium of suitable fittings and lock nuts. A rod 140 extends through a cap 141 carried by the upper end of the stand pipe which rod is actuated by a lever 142 one end of which is in linked engagement 143 with a fixed bracket 144 extending from the cap 141 and whereby movement of the lever will raise or lower the rod 140 and move the stem to in turn move the disk valve assemblies from the positions shown in FIG. 1 to the position shown in FIG. 2. The stand pipe is provided with fittings 160 and 161 which connect with pipes 162 and 163 respectively. Intermediate the valve seats 129 and 130 and extending outwardly from the stand pipe is a fitting 164 and a pipe 165 extends from fitting 164 to a fitting 166 which opens within the casing 1 adjacent the base thereof.

Pipe 15 connects with a pipe 170 having included within its length a valve 171, a pipe 170 being connected to pipe 15 by suitable fittings such as shown at 172 and 173. It is intended that the pipe 170 under control of valve 171 should lead to the pool and is for the purpose of conducting return clean water or water which has been filtered to the pool. Pipe 162 leads to a pump which is connected to a suitable pipe leading to the pool for the purpose of withdrawing water from the pool which is to be cleaned. As a rule, a skimmer and suitable apparatus is utilized in connection with a pump so as not to clog the line leading to the stand pipe 125. Pipe 163 is directed to a waste or sump.

The operation, uses and advantages of the invention are as follows.

Referring to FIGS. 1 and 2 and specifically FIG. 2, when the swimming pool filter is in operation and water is being directed from the pool into the casing or drum type tank 1, the valve 90 which is a diverter valve, is in the position shown by FIG. 2 and wherein the water from the pool under pump pressure is directed into the bottom of the casing or tank 1 under the baffle 200, the water being in contact with the filter disks and specifically the envelopes which may be covered with filter aid material to clean the water of dirt. The valve 171 shown in FIG 1 is open and as the water passes through the envelopes of the disks under pump pressure, air is purged from filter disks at the top of the tank so that clean water flow occurs through pipe or conduit 15 outwardly and back to the pool thereby eliminating the need for an air relief valve. After a period of time, the filter disk envelopes may become dirty and impede the passage of water through said envelopes. Lack of water flow is readily noticeable and indicates to the pool user that the envelopes of the filter disks have become clogged with dirt and should be cleaned. Whereupon the operator or user of the pool closes the valve 171 and moves the valve 90 from the position shown in FIG. 2 to that of FIG. 1 whereupon water under pump pressure from the pool is diverted into the tubular shaft 60 while waste water is directed to a sump through pipe 163. Thus as the water from the pool under pump pressure is passed within the tubular shaft 60 the water flows into the orifice tubes 108. These tubes have orifices or perforations at an angle to the radius of the tube with the result that the water is jetted from said tubes through said orifices against the surfaces of the filter disks. The end tubes have their orifices so positioned as to jet on one surface of the disks as shown at 110, 111 while the orifices of intermediate tubes between the disks have water jetted against contiguous filter disks to produce rotation of the shaft 60 and the tubes. This jetting action of water from the perforated tubes or orifice tubes rotates the tubes and the shaft in one direction while water within the casing or tank has a vortex movement in the opposite direction. This is indicated by the arrows of FIG. 3.

The jetting of water against the envelopes of the filter disks scours the surfaces of the envelopes and if filter aid material covers the envelopes, the filter aid is removed from the surfaces of the envelopes and either drops downwardly for passage with return flow of water and debris to a sump through pipe 163. When the water appears clear in its flow to the sump, the filter disks have been cleaned whereupon the operator will move the valve 90 from the position of FIG. 1 to that of FIG. 2 and direct pool water inwardly of the tank or casing which water may carry a filter aid as a slurry. The valve 171 being open, the slurry will coat the filter disks. Usually the filters remain efficient for a period of time depending upon pool use, and the amount of dirt, dust and the like, received in the pool water. To clean the filter disks the operations previously set forth herein may be repeated such as by closing the valve 171 and causing automatic rotation of the tubular shaft 60 with its orifice tubes to again scour and clean the envelopes of the filter disks and direct dirty water and slurry to a sump. The operation of cleaning is quite automatic requiring simply a shifting of the valve 90. It is possible to use the device without filter aid as the scouring action of the envelopes by the jetted water thereagainst is sufficient. By maintaining the filter disks stationary, the problem of rotating the disks, as is usual practice, is not required and no deleterious action results to the fabric envelopes which usually results when the disks are rapidly turned or spun.

In place of using orifice tubes, half circular disks or like means may be utilized if said instrumentalities are provided with orifices for jetting water at an angle upon the surfaces of the filter disks to produce rotation of said jets and a vortex action of the water within the casing or tank. By arranging the filter disks as described water passes through the envelopes to remove the dirt and clean water is removed at the top of the tank. The contaminated water or dirt bearing water is directed into the casing or tank at the bottom thereof. This has been found to be the ideal way of filtration as dirt and diatomaceous earth is greatly effected by gravity and will fall to the bottom of the tank when the pump for directing water from the pool into the tank is not operating, to cause circulation and filtration, dirt and slurry is picked up and spread evenly on the filter disks for the reason that the filter aid material and the dirt is evenly mixed for distribution on the envelopes of the filter disks. It is interesting to note that it is possible with the present invention to recirculate water from the filters to the pump and back to the filters and still have the spinning and scouring action on said filters by the jetting of water from the orifice tubes against said filters. Under these circumstances filter aid material could be eliminated and a detergent might be substituted for cleaning the fabric envelopes, which detergent and water will pick up the debris and contamination. This action would not require added water for cleaning purposes as the water pressure from the existing pump would be used as the driving force.

It has been pointed out that the average filter device using filter disks is so constructed that water to be filtered is brought into the tank for passage within the filter disks and withdrawal thereof from the interior of the filter disks through a central tube. Such an arrangement has been found to cause a buildup of filter aid material at the zone of greatest water flow which would be at the center of the disks where the water is directed into the central tube for removing clean water. Such a buildup gradually impairs operation of the filter disks and impedes water flow. The present device, as has been pointed out, has no impedence to fresh water flow as the diatomaceous earth or filter aid and water, together with dirt cannot become tightly packed at the center of the filter disks. Furthermore, in the cleaning action of the filter disks the scouring action of water directed through the orifice tubes is such as to remove diatomaceous earth or filter aid and dirt to the outside extremities of the filter disks with flow from the tank or casing at the outer edge of said disks with the result that this invention operates quickly and saves water by more than 50% over commercial devices of the character previously mentioned.

I claim:

1. In filter apparatus: a tank having a pair of side walls and an end wall, a tubular shaft centrally mounted for rotation between the side walls, stationary annular filter disks within said tank and freely surrounding the tubular shaft, orifice tubes radially extending from and communicating with the interior of the tubular shaft, said orifice tubes being positioned adjacent the surface of each filter disk, and means for directing water under pressure into said tubular shaft and orifice tubes to produce rotation of the tubular shaft by water jetting from said orifice tubes against the surfaces of said filter disks with the axis of the orifice at an angle thereto, and outlet means at the bottom of the tank for removing water from the tank.

2. The device of claim 1, characterized in that there is a conduit positioned between the sides of the tank adjacent the top thereof, the filter disks being suspended from said conduit.

3. The device as set forth in claim 1, characterized in that there is a conduit positioned between the sides of the tank adjacent the top thereof, the filter disks being suspended from said conduit and sleeves spacedly surrounding the conduit and lying between the filter disks and between the sides of the tank to provide jacketed spaces for the reception of filtered water for passage through said conduit and outwardly from the tank.

4. The device as set forth in claim 1, said means for directing water into the tubular shaft comprising a diverter valve shiftable to change the direction of flow of water from said tubular shaft and orifice tubes directly into the casing for passage through the filter disks.

References Cited

UNITED STATES PATENTS

| 2,854,142 | 9/1958 | Baker | 210—332 |
| 2,936,075 | 5/1960 | Davis | 210—236 |
| 3,426,907 | 2/1969 | Stone | 210—332 |

REUBEN FRIEDMAN, Primary Examiner

F. A. SPEAR, JR., Assistant Examiner

U.S. Cl. X.R.

210—409